United States Patent
Orita et al.

(10) Patent No.: US 8,504,875 B2
(45) Date of Patent: Aug. 6, 2013

(54) DEBUGGING MODULE TO LOAD ERROR DECODING LOGIC FROM FIRMWARE AND TO EXECUTE LOGIC IN RESPONSE TO AN ERROR

(75) Inventors: Ryuji Orita, Redmond, WA (US); Barry A. Kritt, Raleigh, NC (US); Charles D. Bauman, Sammamish, WA (US); Sumeet Kochar, Apex, NC (US); Jeremy K. Holland, Gig Harbor, WA (US); Karen A. Taylor, Carnation, WA (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 12/647,828

(22) Filed: Dec. 28, 2009

(65) Prior Publication Data

US 2011/0161736 A1    Jun. 30, 2011

(51) Int. Cl.
*G06F 11/00* (2006.01)
(52) U.S. Cl.
USPC .............. 714/30; 714/31; 714/34; 714/38.14; 714/26
(58) Field of Classification Search
USPC ................................ 714/30, 31, 34, 38.14, 26
See application file for complete search history.

(56) References Cited

U.S. PATENT DOCUMENTS

| | | | |
|---|---|---|---|
| 4,860,201 A * | 8/1989 | Stolfo et al. | 712/11 |
| 6,219,782 B1 * | 4/2001 | Khan et al. | 712/227 |
| 6,272,454 B1 * | 8/2001 | Morita et al. | 703/28 |
| 6,353,923 B1 * | 3/2002 | Bogle et al. | 717/128 |
| 6,389,383 B1 * | 5/2002 | Sarathy et al. | 703/21 |
| 7,237,086 B1 | 6/2007 | Kothandapani | |
| 7,269,768 B2 * | 9/2007 | Rothman et al. | 714/723 |
| 7,426,659 B2 * | 9/2008 | Blasco Allue et al. | 714/27 |
| 7,434,102 B2 | 10/2008 | Rothman et al. | |
| 7,555,676 B2 | 6/2009 | Lopez, Jr. et al. | |
| 7,568,091 B2 | 7/2009 | Wu et al. | |
| 7,594,144 B2 | 9/2009 | Brandyberry et al. | |
| 7,861,119 B1 * | 12/2010 | Righi et al. | 714/38.1 |
| 7,870,434 B2 * | 1/2011 | Moyer et al. | 714/41 |
| 7,984,352 B2 * | 7/2011 | Greb | 714/733 |

(Continued)

FOREIGN PATENT DOCUMENTS

TW    236621 B1    7/2005

OTHER PUBLICATIONS

"Method to use Baseboard Management Controller to detect alteration of electronic device", IP.com No. IPCOM000184091D, Jun. 10, 2009.

*Primary Examiner* — Loan L. T. Truong
(74) *Attorney, Agent, or Firm* — Thomas E. Tyson

(57) ABSTRACT

A computing device includes a processor, firmware, a hardware component, and a debugging module. The firmware stores error decoding logic particular to the computing device. The hardware component detects an error in the computing device, and responsively issues an interrupt and halts the processor such that the processor cannot execute any more computer-readable code. The debugging module loads the logic from the firmware at reset and executes the logic responsive to the interrupt. The debugging module does not use the processor to execute the logic, the firmware is not part of the debugging module, and the debugging module is not part of the hardware component. The firmware may also store a mapping between registers of the hardware component and field-replaceable hardware units of the computing device, which the debugging module loads at reset and uses when executing the error decoding logic to determine which unit has caused the error.

20 Claims, 4 Drawing Sheets

(56) References Cited

U.S. PATENT DOCUMENTS

| | | | |
|---|---|---|---|
| 8,103,923 B2* | 1/2012 | Niijima | 714/724 |
| 2003/0014738 A1* | 1/2003 | Dawkins et al. | 717/131 |
| 2003/0074650 A1* | 4/2003 | Akgul et al. | 717/129 |
| 2003/0217256 A1* | 11/2003 | Gilstrap et al. | 713/100 |
| 2004/0113668 A1* | 6/2004 | Gaskins et al. | 327/158 |
| 2005/0015582 A1* | 1/2005 | Shida et al. | 713/2 |
| 2005/0223359 A1* | 10/2005 | Rao Nagaraju et al. | 717/124 |
| 2007/0174705 A1* | 7/2007 | Shih | 714/36 |
| 2007/0180322 A1* | 8/2007 | Todoroki et al. | 714/34 |
| 2007/0294675 A1* | 12/2007 | Barraclough et al. | 717/137 |
| 2008/0140985 A1* | 6/2008 | Kitamorn et al. | 711/173 |
| 2008/0270827 A1 | 10/2008 | Brandyberry et al. | |
| 2009/0049330 A1* | 2/2009 | Bavaria et al. | 714/3 |
| 2009/0313610 A1* | 12/2009 | Vaidyanathan et al. | 717/129 |

* cited by examiner

DEBUGGING MODULE TO LOAD ERROR DECODING LOGIC FROM FIRMWARE AND TO EXECUTE LOGIC IN RESPONSE TO AN ERROR

FIELD OF THE INVENTION

The present invention relates generally to a computing device in which errors can occasionally occur. The present invention relates more particularly to a debugging module that loads error decoding logic from firmware of the computing device, and thereafter executes the logic responsive to an error occurring within the computing device.

BACKGROUND OF THE INVENTION

Modern computing devices include a wide-variety of different hardware, including processors, memory, chipsets, and other types of hardware. Occasionally errors can occur within a computing device that result from failure of the hardware of the computing device. For example, the memory of a computing device may have a number of memory locations that store data. If the memory fails, some of its memory locations may not be able to properly store data.

SUMMARY OF THE INVENTION

A computing device of an embodiment of the invention includes a processor, firmware, a hardware component, and a debugging module. The firmware stores error decoding logic particular to the computing device. The hardware component detects an error in the computing device, and in response issues an interrupt and halt the processor such that the processor is unable to execute any more computer-readable code. The debugging module loads the error decoding logic at reset of the computing device, and executes the error decoding logic in response to the interrupt being issued by the hardware component. The debugging module does not use the processor to execute the error decoding logic, the firmware is not part of the debugging module, and the debugging module is not part of the hardware component.

In a method of an embodiment of the invention, at reset of a computing device, error decoding logic particular to the computing device is loaded by a debugging module of the computing device from firmware of the computing device. The firmware is not part of the debugging module. In response to an error occurring in the computing device, the method includes issuing an interrupt by a hardware component of the computing device, where the debugging module is not part of the hardware component. Thereafter, a processor of the computing device by the hardware component is halted, such that the processor is unable to execute any more computer-readable code, and the error decoding logic is executed by the debugging module.

A debugging module of an embodiment of the invention is for a computing device and includes hardware, a first component, and a second component. The hardware is other than a processor of the computing device. The first component is implemented by the hardware to load error decoding logic from firmware of the computing device at reset of the computing device. The error decoding logic is particular to the computing device. The second component is implemented by the hardware to execute the error decoding logic in response to an interrupt being issued by a hardware component of the computing device. The firmware is not part of the debugging module, and the debugging module is not part of the hardware component.

A computer program product of an embodiment of the invention corresponds to firmware of a computing device. The computer program product includes a computer-readable storage medium having computer-readable program code embodied therein. The computer-readable program code includes storage computer-readable program code and transmission computer-readable program code. The storage code stores error decoding logic particular to the computing device. The error decoding logic is executed by a debugging module of the computing device that is separate from the firmware in response to an interrupt being issued by a hardware component of the computing device that is separate from the debugging module. The transmission code transmits the error decoding logic to the debugging module at reset of the computing device, where the debugging module does not use a processor of the computing device to execute the error decoding logic.

DETAILED DESCRIPTION OF THE DRAWINGS

Figure 1:
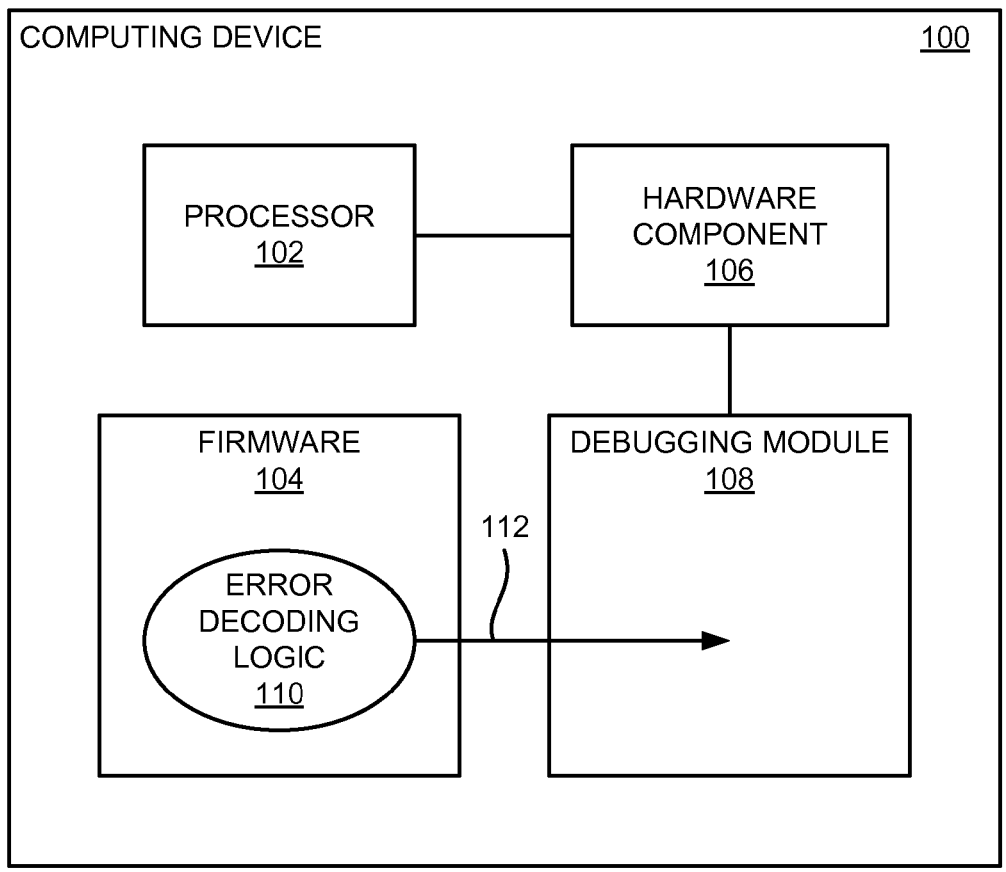
FIG. 1 is a diagram of a computing device, according to a general embodiment of the present invention.

As noted in the background section, errors can occur within a computing device that result from failures of the hardware of the computing device. The detection of an error by a chipset or other hardware within the computing device can result in the issuance of an interrupt, such as a system management interrupt (SMI), which traditionally has been handled by a processor of the computing device. The processor performs an error handling routine responsive to the issuance of the interrupt, so that the error can be properly logged for subsequent analysis as to why the error occurred.

However, more recently, chipsets have begun to include more advanced error handling architectures. A chipset is a group of integrated circuits that are designed to work together to provide desired functionality. For instance, the chipset of a computing device typically interfaces the processor of a computing device with the memory and other hardware of the computing device, such as graphics cards, networking adapters, expansion cards, and so on.

The error handling architecture of a chipset of a computing device is typically designed to halt further execution of computer-readable code by the processor of a computing device when an uncorrectable error occurs. An uncorrectable error is an error typically resulting from a hardware failure, and is uncorrectable in the sense that the error cannot be corrected by the hardware or by firmware, such that continued code execution by the processor may result in unreliable operation. By comparison, a correctable error is an error typically resulting from a hardware failure that can be corrected by the hardware or by firmware, such that reliable operation can be maintained. Halting further code execution by the processor is advantageous, because continued execution of such code by the processor when hardware has failed within the computing device can result in the corruption of data and the improper execution of this code. However, the chipset halting further execution of computer-readable code by the processor is disadvantageous as well.

In particular, even though the processor of the computing device traditionally has handled uncorrectable errors when they occur through appropriate error handling routines, with the more advanced error handling architectures of chipsets, error handling no longer requires the execution of an error handling routine by the processor. Specifically, when an uncorrectable error occurs, the chipset halts the processor so that it cannot execute any more computer-readable code. Because the processor has been halted, it also cannot execute an error handling routine as in the past.

Therefore, other hardware of the computing device has now become responsible for handling uncorrectable errors when they occur within computing devices. In particular, the system management controller, which is also referred to as a baseboard management controller, may be responsible for handling uncorrectable errors. The system management controller is a controller that is typically found in some types of server computing devices, to permit an administrator to remotely manage the computing device.

A given system management controller architecture may be used in a wide variety of different types of computing devices that employ different types of memory, processors, chipsets, and other hardware. Therefore, it is desirable for a given system management controller to be able to handle uncorrectable errors that may occur in any type of computing device in which the system management controller may be used. In this way, regardless of the architecture of the computing device in which the system management controller has been installed, the controller is able to handle uncorrectable errors.

However, this approach is disadvantageous for a number of reasons. First, for instance, the storage space of a system management controller is relatively limited. Therefore, storing information for all the different types of errors, such as uncorrectable errors, that can occur within all the different types of computing devices in which the system management controller may be used may prove untenable, unless the amount of storage space within the system management controller were increased, which can be costly.

Second, if a new type of hardware is to be employed in a given computing device, two updates have to be performed. As is customary, the firmware of the computing device itself has to be updated to be aware of the new hardware. However, the system management controller also has to be updated to be able to handle errors, such as uncorrectable errors, resulting from this new hardware. As such, the number of components within a computing device that have to be updated increases by a factor of two. Furthermore, when both the firmware and the system management controller have to be updated in this way, the updates have to be coordinated with one another, so that the firmware is upgraded when the controller is, and vice-versa. Otherwise, the computing device in question may not operate properly. That is, the firmware upgrade and the system management controller upgrade are corequisites, and have to be performed concurrently with one another.

Embodiments of the present invention overcome these disadvantages associated with the prior art. A system management controller, which is more generally referred to as a debugging module, is responsible for executing error decoding logic when an error like an uncorrectable error occurs within a computing device. However, the system management controller does not have to store the error decoding logic of all the different types of computing devices in conjunction with which the controller may be employed, as in the prior art, such that the system management controller has reduced storage space requirements.

Rather, the firmware of the computing device itself, which itself may be particular to just the type of hardware that has been installed within the computing device, stores this error decoding logic. The error decoding logic may be particular to handling errors, such as uncorrectable errors, just within the specific computing device in question. At reset of the computing device, the error decoding logic is loaded from the firmware to the system management controller. When an error occurs, the controller executes this logic.

Therefore, when a new type of hardware is to be employed in the computing device in question, just one update has to be performed. Specifically, the firmware of the computing device is updated, both to be aware of the new hardware as is customary, and also to update the error decoding logic. The system management controller, which prior to loading the error decoding logic from the firmware is indeed unable to handle errors like uncorrectable errors within the computing device, does not have to be updated.

As a result, embodiments of the present invention permit a common system management controller to be employed across different types of computing devices, having different types of chipsets, and still be able to handle errors, such as uncorrectable errors, that occur within these computing devices. The error decoding logic that is particular to a given computing device is first loaded from the computing device's firmware to the system management controller. Thereafter, when an uncorrectable error occurs, the system management controller is able to properly handle the error, because it now has the error decoding logic loaded.

FIG. 1 shows a representative computing device 100, according to a general embodiment of the invention. The computing device 100 includes a processor 102, firmware 104, a hardware component 106, and a debugging module 108. The computing device 100 can include other hardware, in addition to the processor 102, the firmware 104, the hardware component 106, and the debugging module 108. Such additional hardware can include memory, graphics cards, network adapters, and so on. It is noted that the firmware 104 is not part of the debugging module 108, and is not firmware for the module 108. Furthermore, the debugging module 108 is not part of the hardware component 106, but rather is separate from the component 106.

The firmware 104 stores error decoding logic 110 that is particular to the computing device 100. That is, the error decoding logic 110 is adapted to decode errors, such as uncorrectable errors, that occur as a result of failure of the specific hardware installed within the computing device 100. The error decoding logic 110 typically is not adapted to decode errors that are specific to hardware that is not installed within the computing device 100. That is, the error decoding logic 110 is not universal error decoding logic.

When the computing device 100 is reset, including when the device 100 is turned on, the debugging module 108 loads the error decoding logic 110 from the firmware 104, as indicated by the arrow 112. Prior to such loading, the debugging module 108 may not have any ability to decode errors, such as uncorrectable errors, that occur within the computing device 100. That is, prior to the loading of the error decoding logic 110, the debugging module 108 may be unparticular to the errors that can occur within the computing device 100. The debugging module 108 may not have any error decoding logic preinstalled or preloaded in this respect, or such preinstalled or preloaded logic may be generic and not particular to the errors that can occur as a result of failure of the hardware installed within the computing device 100.

The hardware component 106 detects errors, such as uncorrectable errors, that occur within the computing device 100, as part of an error handling error architecture of the component 106. In response, the hardware component 106 halts the processor 102, so that the processor 102 is unable to continue executing computer-readable code. That is, the processor 102 is halted, and place in a state in which it cannot execute any computer-readable code. The hardware component 106 further issues an interrupt in response to an error being detected within the computing device 100.

The debugging module 108 is responsive to the issuance of this interrupt. In response to the issuance of the interrupt, the debugging module 108 executes the error-decoding logic 110 that was previously loaded into the module 108. The debugging module 108 does not use the processor 102 to execute the error decoding logic 110. For example, the debugging module 108 may have its own processor, such as a service processor, so that it can execute the error decoding logic 110.

In general, executing the error decoding logic 110 results in the generation of a log regarding the error, which may be an uncorrectable error. The log provides specific information regarding the error, such as when the occurred, in which hardware the error occurred, what code was being executed when the error occurred, and so on. This information permits an administrator or other user to analyze why the error occurred, so that corrective actions can be performed. This information may have to be assembled before the computing device 100 is rebooted, as some of the information that is generated by execution of the error decoding logic 110 may not be able to be generated once the device 100 is rebooted.

In the computing device 100, the error decoding logic 110 may have to be periodically updated, as a result of, for instance, new hardware being installed within the computing device 100. In this situation, just the firmware 104 has to be updated with the error decoding logic 110. The debugging module 108, by comparison, does not have to be updated. Rather, the debugging module 108 will receive the updated error decoding logic 110 the next time the computing device 100 is reset.

Figure 2:
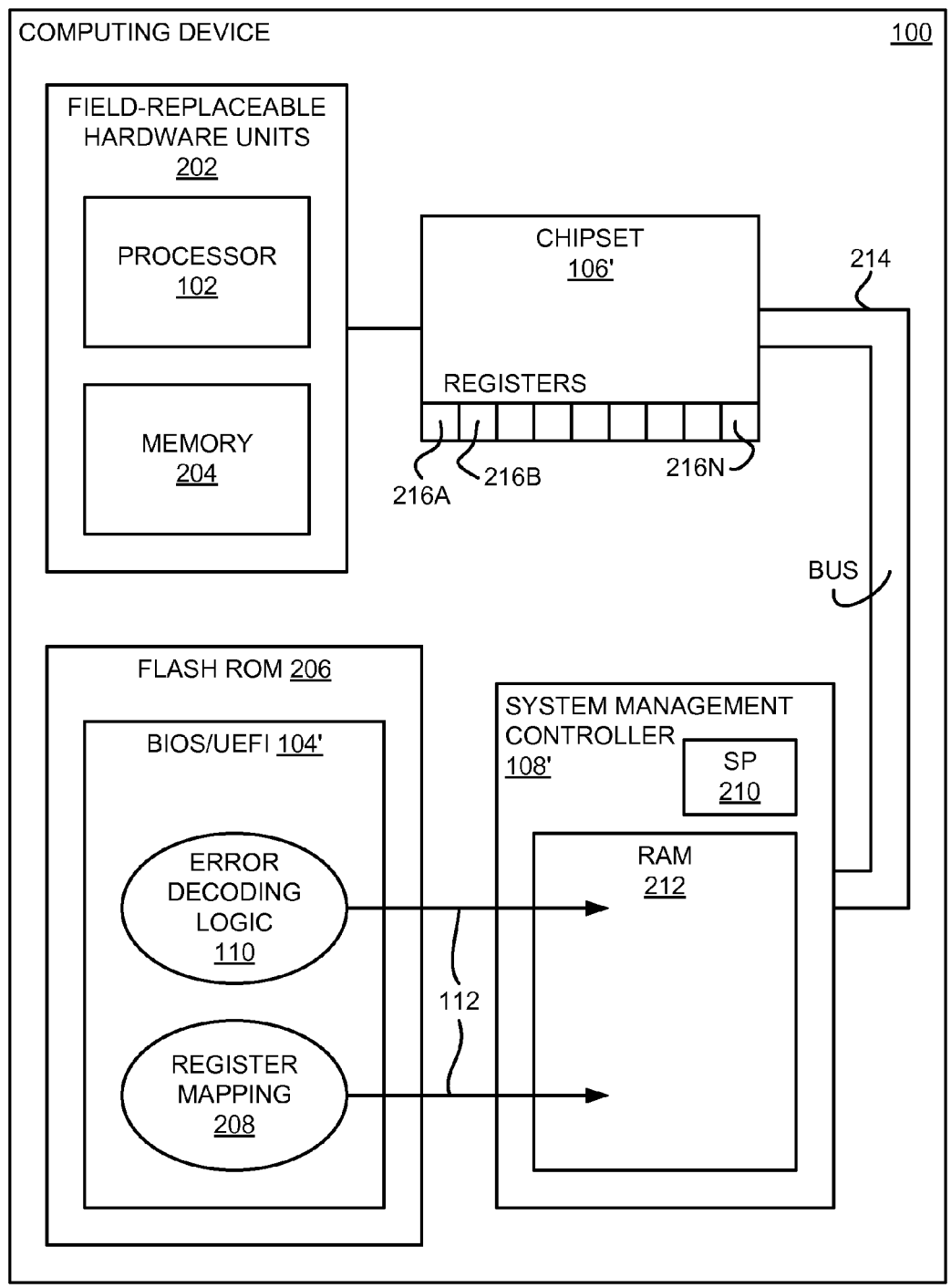
FIG. 2 is a diagram of a computing device that is more detailed than but consistent with the computing device of FIG. 1, according to a more specific embodiment of the present invention.

FIG. 2 shows the computing device 100 in more detail, according to a more specific embodiment of the invention. In the embodiment of FIG. 2, the firmware 104 is specifically a basic input/output system (BIOS) or a unified extendable firmware interface (UEFI) firmware, which is referred to as BIOS/UEFI 104'. The BIOS/UEFI 104' is stored within a flash read-only memory (ROM) 206. Furthermore, the hardware component 106 is specifically a chipset 106', and the debugging module 108 is specifically a system management controller 108', which also may be referred to as a baseboard management controller.

The computing device 100 in FIG. 2 includes a number of field-replaceable hardware units 202, such as a processor 102 and memory 204, among other types of field-replaceable hardware units 202. The hardware units 202 are field-replaceable in that an administrator or other user can replace the units 202 at the location in which the computing device 100 is being used, without having to send the computing device 100 to a different location for repair. For example, the processor 102 may be mounted in a socket of the computing device 100 and the memory 204 may be mounted in a slot of the computing device 100, permitting the processor 102 and the memory 204 to be swapped out for a new processor 102 and new memory 204.

The chipset 106' is generally a group of integrated circuits that are designed to work together to provide desired functionality, as noted above. For instance, the chipset of a computing device typically interfaces the processor of a computing device with the memory and other hardware of the computing device, such as graphics cards, networking adapters, expansion cards, and so on. Examples of chipsets include the X48, P43, G43, Q43, B43, and X58 chipsets, available from Intel Corp., of Santa Clara, Calif., as well as the 790FX, 790GX, 785G, 780V, and 780E, available from Advanced Micro Devices of Sunnyvale, Calif. Some types of chipsets can include a Northbridge controller and a Southbridge controller, the former being directly connected to the processor 102, and the latter which can also be referred to as an input/output controller hub (ICH) or a peripheral component handler (PCH) and that includes the slower components of the chipset.

The chipset 106' includes a number of registers 216A, 216B, . . . , 216N, collectively referred to as the registers 216. The registers 216 correspond to the field-replaceable hardware units 202 installed within the computing device 100. There may be a register for each unit 202 that can be installed within the computing device 100. For example, if the computing device 100 has two sockets that are receptive to the installation of processors, there may be two registers corresponding to these sockets. Likewise, if the computing device 100 has four slots that are receptive to the installation of memory modules, there may be four registers corresponding to these slots.

The BIOS/UEFI 104' includes the error decoding logic 110 and a register mapping 208. The error decoding logic 110 may be, include, or be part of a script that is executable in conjunction with the LINUX operating system, include the LINUX operating system, where LINUX is a trademark of Linus Torvalds. The register mapping 208 maps the registers 216 to the field-replaceable hardware units 202. While the register mapping 208 is depicted in FIG. 2 as being separate from the error decoding logic 110, in another embodiment the mapping 208 may be integrated within the logic 110.

The register mapping 208 is used by the system management controller 108' when executing the error decoding logic 110. Specifically, the register mapping 208 permits the system management controller 108' to determine which field-replaceable hardware unit 202 has caused an error, such as an uncorrectable error. The system management controller 108' inspects the registers 216 to locate in which register 216 the chipset 106' has placed error-containing information. The system management controller 108' then correlates the register 216 in question with one of the field-replaceable hardware units 202 using the register mapping 208 to determine which unit 202 has caused the error.

The system management controller 108' is a specialized component within the computing device 100 that typically communicates with a management console, which may be a separate computing system or device that is used by an administrator. As such, the administrator may be able to issue commands at the management console, which are communicate to the system management controller 108' for performance in relation to the computing device 100. In this way, for instance, the administrator may be able to remotely reboot the computing device 100. Furthermore, the system management controller 108' may monitor the computing device 100 and report information such as processor temperature, processor utilization, fan speed, and so on, back to the management console, for remote management of the computing device 100.

The system management controller 108' includes random-access memory (RAM) 212, into which the error decoding logic 110 and the register mapping 208 are loaded from the BIOS/UEFI 104'. The system management controller 108' may also include a service processor 210. The service processor 210 is an adjunct processor to the processor 102, and is technically not considered a processor of the computing device 100, but rather is a processor of the system management controller 108'. This is because the service processor 210 is not used to execute computer-readable code to achieve desired functionality of the computing device 100, but rather is dedicated to performing the monitoring and management functionality of the system management controller 108'.

For example, the computing device 100 may be used as a web server, in which the device 100 receives requests from clients over the Internet, and in response processes these requests to generate responses that are sent back to the clients. The request receiving, request processing, response generation, and response sending make up the functionality of the computing device 100. However, the service processor 210 does not contribute to this functionality. That is, the service processor 210 does not receive these requests, process the requests, generating corresponding responses, or send these responses back to clients over the Internet.

The computing device 100 further includes a bus 214 that communicatively interconnects at least the chipset 106' and the system management controller 108' together. The bus 214 may be an inter-integrated circuit (i2c) bus, a platform environment control interface (PECI) bus, or another type of bus. The bus 214 permits the system management controller 108' to detect when the chipset 106' has issued an interrupt. The bus 214 further permits the system management controller 108' to access the information stored in the registers 216 of the chipset 106'.

Figure 3:
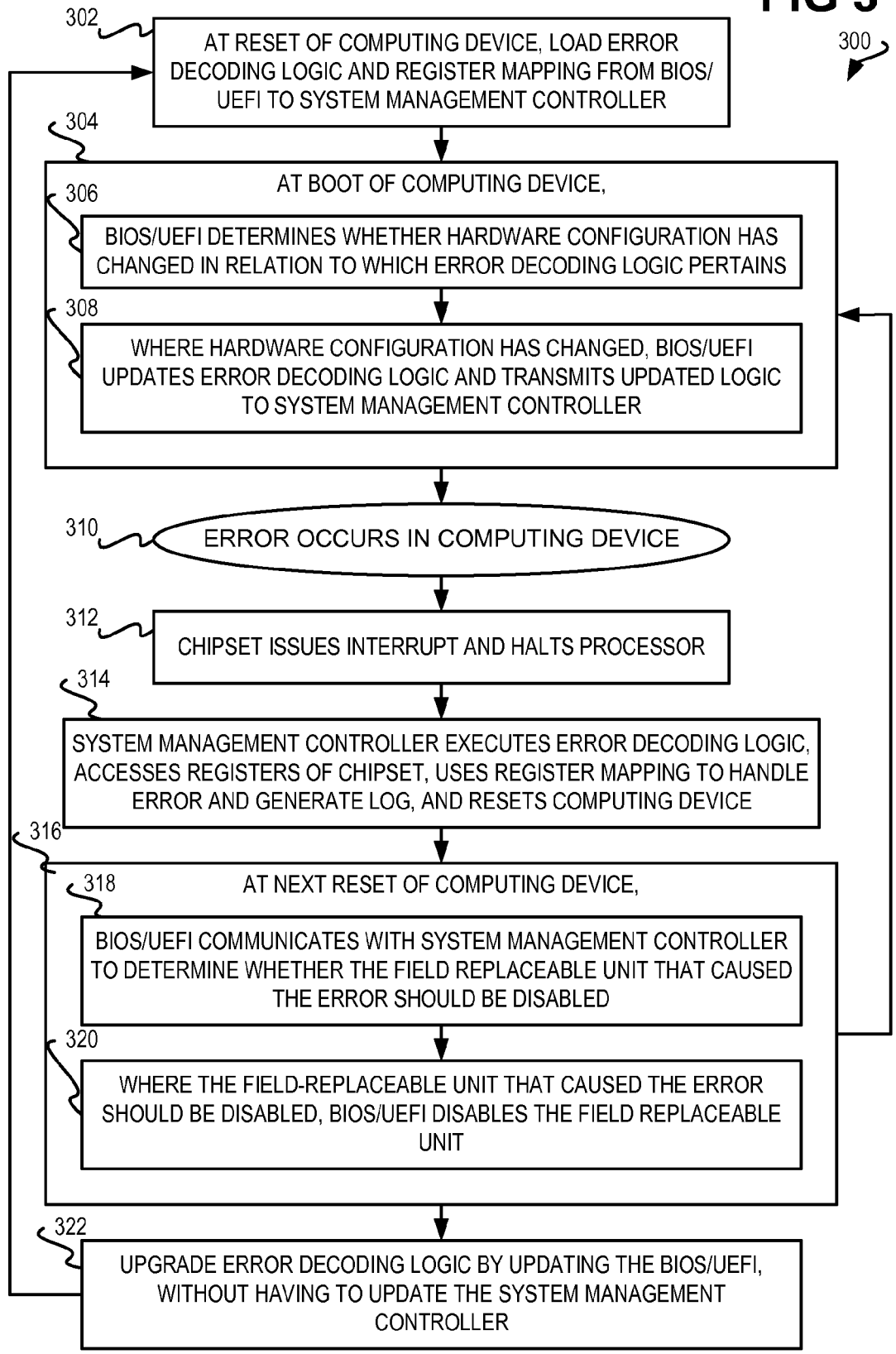
FIG. 3 is a flowchart of an error-handling method, according to an embodiment of the present invention.

FIG. 3 shows a method 300, according to an embodiment of the invention. The method 300 is described in relation to the computing device 100 of FIG. 2, but is also more generally applicable to the computing device 100 of FIG. 1. At reset of the computing device 100—including when the computing device 100 is first turned on—the error-decoding logic 110 and the register mapping 208 are loaded from the BIOS/UEFI 104' to the system management controller 108' (302). The reset of the computing device 100 may be a warm reset or a cold reset. In a warm reset, the computing device 100 has already been on but is reset, whereas in a cold reset, the device 100 is turned on.

During or at boot of the computing device 100, the following is performed (304). The BIOS/UEFI 104' determines whether the hardware configuration has changed, in relation to which the error decoding logic 110 pertains (306). If there has been such a hardware configuration change, then the BIOS/UEFI 104' updates the error decoding logic 110 and transmits the updated logic 110 to the system management controller 108' (308).

For example, new hardware may have been installed within the computing device 100, or existing hardware may have been removed from the device 100. The original error decoding logic 110 stored in the BIOS/UEFI 104' may pertain to a hardware configuration prior to the installation of the new hardware, or prior to the removal of the existing hardware. As such, the BIOS/UEFI 104' in one embodiment may be able to update the error decoding logic 110 itself. The updated error decoding logic 110 is transmitted to the system management controller 108', so that the controller 108' has error decoding logic 110 that accurately reflects the current hardware configuration of the computing device 100.

At some point, an error, such as an uncorrectable error, occurs in the computing device 100 (310). The error is considered a hardware error, in that the error results from failed hardware of the computing device 100, particularly one of the field-replaceable hardware units 202 in one embodiment. However, the error may manifest itself in the form of a software error. As one example, computer-readable code being executed by the processor 102 may attempt to perform illegal operations.

In response, the chipset 106' issues an interrupt on one of its pins that is connected to the bus 214, and halts the processor 102 so that the processor 102 can no longer continue executing computer-readable code (312). The chipset 106' further in part 312 places information regarding the error in the register 216 corresponding to the field-replaceable hardware unit 202 that caused the error. The system management controller 108', responsive to the issuance of the interrupt, executes the error decoding logic 110 previously loaded into its RAM 212, accesses the registers 216 of the chipset 106' via the bus 214, uses the register mapping 208 also previously loaded into its RAM 212, and generates an appropriate log (108'). In this way, the system management controller 108' handles the error.

More specifically, the error decoding logic 110, when executed by the system management controller 108', accesses the registers 216, and using the register mapping 208, determines which field-replaceable hardware unit 202 caused the error (314). Execution of the error decoding logic 110 results in the generation of a log that can be used by an administrator later to assess the nature of the error, such as which hardware unit 202 caused the error, when the error occurred, what computer-readable code was being executed when the error occurred, and so on. The error decoding logic 110 may ultimately conclude that a failure in one of the field-replaceable hardware units 202 caused the error. Furthermore, in part 314, the system management controller 108' resets the computing device 100.

At this next reset of the computing device 100, therefore, the following is performed (316). The BIOS/UEFI 104' communicates with the system management controller 108' to determine whether the field-replaceable hardware unit 202 that caused the error should be disabled (318). For example, the system management controller 108' may conclude that while a given hardware unit 202 caused the error, this unit 202 did not do so because it failed, but rather because, for instance, it was executing malformed computer-readable code. However, as another example, the controller 108' may alternatively conclude that the given hardware unit 202 that caused the error did do so because the unit 202 has failed. In this instance, the system management controller 108' will conclude that the field-replaceable hardware unit 202 that caused the error should be disabled, and in response, the BIOS/UEFI 104' thus disables the hardware unit 202 in question (320).

After part 316 has been performed, the method 300 may be repeated at part 304, in which the computing device 100 is rebooted as before. However, at some point it may be determined that the error decoding logic 110 and/or the register mapping 208 has to be upgraded. In this case, the error decoding logic 110 and/or the register mapping 208 is upgraded by just updating the BIOS/UEFI 104', without having to update the system management controller 108' (322). For instance, the flash ROM 206 may be flashed with updated error decoding logic 110 and/or an updated register mapping 208. No corresponding update process has to be performed for the system management controller 108'. Rather, the method 300 proceeds back to part 302, at which time the updated logic 110 and/or the updated mapping 208 are loaded into the system management controller 108', as has been described.

Figure 4:
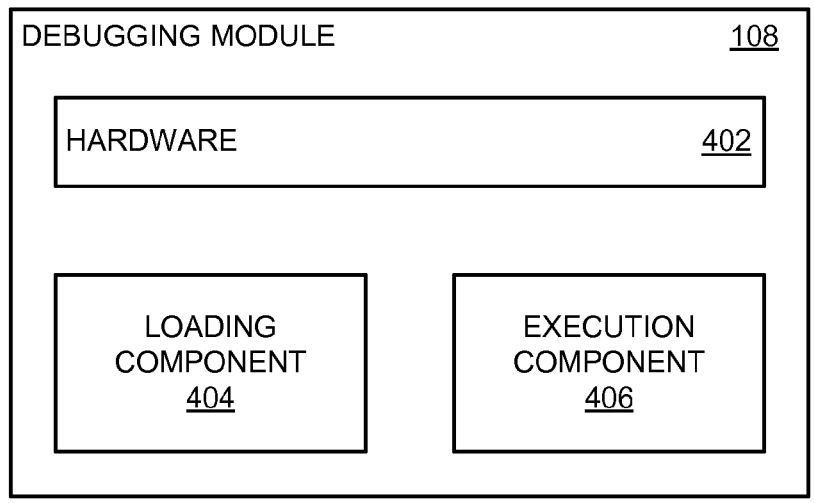
FIG. 4 is a block diagram of a debugging module of a computing device, according to an embodiment of the present invention.

FIG. 4 shows a rudimentary block diagram as to how the debugging module 108, including the system management controller 108' in one embodiment, can be implemented, according to an embodiment of the invention. The debugging module 108 includes hardware 402, a loading component 404, and an execution component 406. The hardware 402 does not include the processor 102 or other field-replaceable hardware units 202 of the computing device 100. The hardware 402 can include, however, the service processor 210 of the system management controller 108', among other types of hardware.

The loading component 404 and the execution component 406 are said to be implemented by the hardware 402. In one embodiment, this can mean that each of the components 404 and 406 is implemented in hardware 402. In another embodiment, this can mean that the components 404 and 406 store computer-readable code that is executed by the hardware 402, such as by the service processor 210 of the system management controller 108'.

The loading component 404 loads the error decoding logic 110 and the register mapping 208 from the firmware 104 at reset of the computing device 100. The second component executes the error decoding logic 110 in response to an interrupt being issued by the hardware component 106, and uses the register mapping 208 to determine which field-replaceable hardware unit 202 has caused the error. Prior to loading of the error decoding logic 110 by the loading component 404, the second component 406 is unable to handle errors within the computing device 100, such that prior to the loading of the logic 110, the debugging module 108 is unparticular to the errors that can occur within the device 100, as has been described above.

Figure 5:
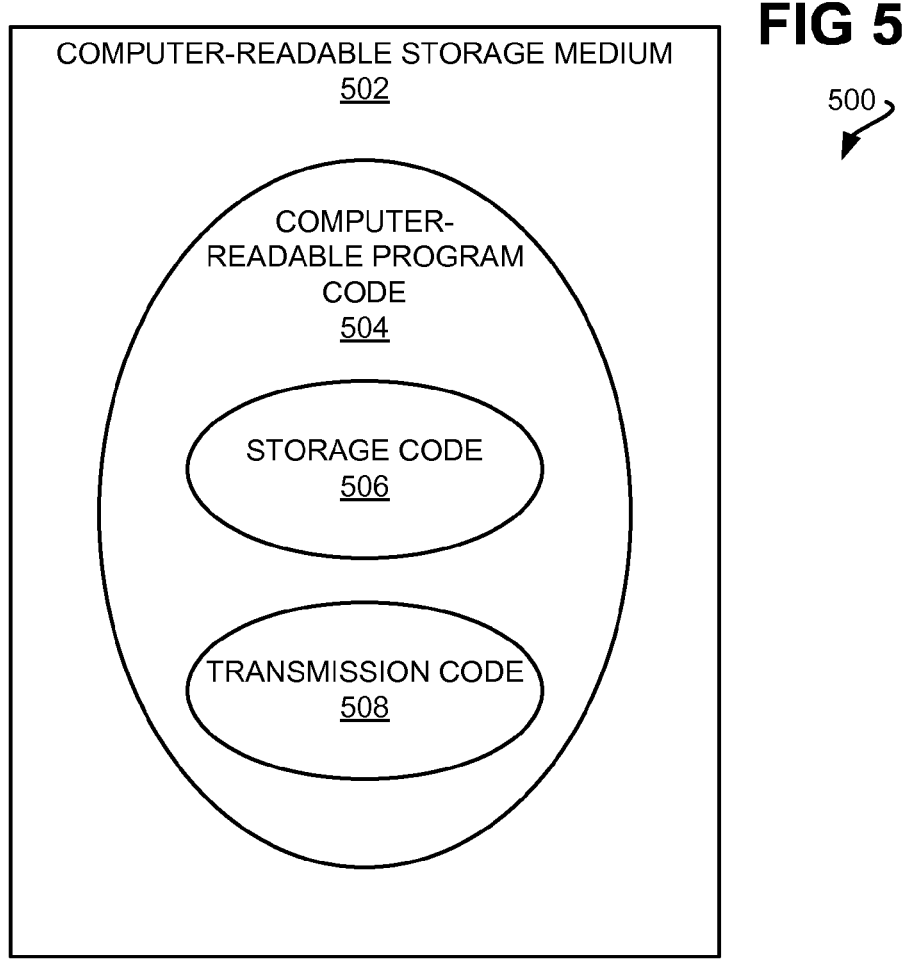
FIG. 5 is a block diagram of a computer program product corresponding to firmware of a computing device, according to an embodiment of the present invention.

FIG. 5 shows a rudimentary block diagram of a representative computer program product 500 that corresponds to the firmware 104 of the computing device 100, according to an embodiment of the invention. The computer program product 500 includes a computer-readable storage medium 502 that has computer-readable program code 504 stored thereon. The computer-readable storage medium 502 is a data storage medium, such as a volatile medium like dynamic random access memory, or a non-volatile medium like a hard disk drive or flash memory. The computer-readable program code 504 includes storage code 506 and transmission code 508.

The storage code 506 stores the error decoding logic 110 and the register mapping 208 that are particular to the computing device 100. As noted above, the error decoding logic 110 is executed by the debugging module 108, which is separate from the firmware 104, and which uses the register mapping 208 to determine which field-replaceable hardware unit 202 has caused a given error. The transmission code 508 transmits the error decoding logic 110 and the register mapping 208 to the debugging module 108 at reset of the computing device 100.

It is finally noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A computing device comprising:
    a processor;
    firmware to store error decoding logic particular to the computing device;
    a hardware component to detect an error in the computing device, and in response to issue an interrupt and halt the processor such that the processor is unable to execute any more computer-readable code; and,
    a debugging module to load the error decoding logic at reset of the computing device and to execute the error decoding logic in response to the interrupt being issued by the hardware component,
    wherein the debugging module does not use the processor to execute the error decoding logic, wherein the firmware is not part of the debugging module, and wherein the debugging module is not part of the hardware component.

2. The computing device of claim 1, further comprising:
    memory; and,
    a plurality of field-replaceable hardware units including the processor and the memory,
    wherein the firmware is further to store a mapping between a plurality of registers of the hardware component and field-replaceable hardware units of the computing device,
    wherein the debugging module is to further load the mapping at reset of the computing device and is to use the mapping when executing the error decoding logic to determine which field-replaceable hardware unit has caused the error.

3. The computing device of claim 1, wherein where the error decoding logic is upgraded, just the firmware has to be updated, and not the debugging module.

4. The computing device of claim 1, wherein the hardware component comprises a chipset of the computing device.

5. The computing device of claim 1, wherein the debugging module is to execute the error decoding logic to generate a log regarding the error.

6. The computing device of claim 1, wherein the debugging module prior to loading of the error decoding logic particular to the computing device from the firmware is unable to handle errors within the computing device, such that the debugging module is unparticular to the errors that can occur within the computing device prior to loading of the error decoding logic.

7. A method comprising:
    at reset of a computing device,
        loading error decoding logic particular to the computing device, by a debugging module of the computing device from firmware of the computing device, where the firmware is not part of the debugging module;
    in response to an error occurring in the computing device,
        issuing an interrupt by a hardware component of the computing device, where the debugging module is not part of the hardware component;
        halting a processor of the computing device by the hardware component, such that the processor is unable to execute any more computer-readable code; and,
        executing the error decoding logic by the debugging module.

8. The method of claim 7, wherein loading the error decoding logic by the debugging module from the firmware further comprises loading a mapping between a plurality of registers of the hardware component and field-replaceable hardware units of the computing device, wherein executing the error decoding logic by the debugging module comprises using the mapping to determine which field-replaceable hardware unit has caused the error, and wherein the field-replacement hardware units comprise the processor and memory of the computing device.

9. The method of claim 8, wherein executing the error decoding logic by the debugging module further comprises accessing the registers of the hardware component by the debugging module.

10. The method of claim 8, further comprising, at a next reset of the computing device after the debugging module has executed the error decoding logic, communicating by the firmware with the debugging module to determine whether the field-replaceable hardware unit that caused the error should be disabled;

in response to determining that the field-replaceable hardware unit that caused the error should be disabled, disabling the field-replacement hardware unit by the firmware.

11. The method of claim 7, further comprising, after the reset of the computing device, during boot of the computing device, determining, by the firmware, whether a hardware configuration of the computing device has changed in relation to a prior boot of the computing device;

in response to determining that the hardware configuration of the computing device has changed, updating the error decoding logic by the firmware;

transmitting the error decoding logic, as has been updated, from the firmware to the debugging module.

12. The method of claim 7, further comprising, upgrading the error decoding logic by updating just the firmware, such that the debugging module does not have to be updated to upgrade the error decoding logic.

13. The method of claim 7, wherein executing the error decoding logic by the debugging module comprises generating a log regarding the error.

14. The method of claim 7, wherein the debugging module prior to loading of the error decoding logic particular to the computing device from the firmware is unable to handle errors within the computing device, such that the debugging module is unparticular to the errors that can occur within the computing device prior to loading of the error decoding logic.

15. A debugging module for a computing device comprising:

hardware other than a processor of the computing device;

a first component implemented by the hardware to load error decoding logic from firmware of the computing device at reset of the computing device, the error decoding logic particular to the computing device; and, a second component implemented by the hardware to execute the error decoding logic in response to an interrupt being issued by a hardware component of the computing device, wherein the firmware is not part of the debugging module, and wherein the debugging module is not part of the hardware component.

16. The debugging module of claim 15, wherein the first component is further to load a mapping between a plurality of registers of the hardware component and field-replaceable hardware units of the computing device, wherein the second component is to use the mapping when executing the error decoding logic to determine which field-replaceable hardware unit has caused the error, and wherein the second component is to execute the error decoding logic to generate a log regarding the error.

17. The debugging module of claim 15, wherein the second component prior to loading of the error decoding logic is unable to handle errors within the computing device, such that the debugging module is unparticular to the errors that can occur within the computing device prior to loading of the error decoding logic.

18. The debugging module of claim 15, wherein the debugging module is one or more of: a system management controller and a baseboard management controller.

19. A computer program product corresponding to firmware of a computing device comprising:

a computer-readable storage medium having computer-readable program code embodied therein, the computer-readable program code comprising:

storage computer-readable program code to store error decoding logic particular to the computing device, the error decoding logic executed by a debugging module of the computing device separate from the firmware in response to an interrupt being issued by a hardware component of the computing device separate from the debugging module; and, transmission computer-readable program code to transmit the error decoding logic to the debugging module at reset of the computing device, the debugging module not using a processor of the computing device to execute the error decoding logic.

20. The computer program product of claim 19, wherein the storage computer-readable program code is to further store a mapping between a plurality of registers of the hardware component and field-replaceable hardware units of the computing device, wherein the transmission computer-readable program code is further to transmit the mapping to the debugging module at reset of the computing device, the debugging module to use the mapping when executing the error decoding logic to determine which field-replacement hardware unit has caused the error.

* * * * *